US006370003B1

(12) United States Patent
Hennick

(10) Patent No.: US 6,370,003 B1
(45) Date of Patent: Apr. 9, 2002

(54) ELECTROSTATIC CHARGE RESISTANT INSTRUMENT SYSTEM

(75) Inventor: Robert J. Hennick, Auburn, NY (US)

(73) Assignee: Welch Allyn Data Collections, Inc., Skaneateles Falls, NY (US)

( * ) Notice: Subject to any disclaimer, the term of this patent is extended or adjusted under 35 U.S.C. 154(b) by 0 days.

(21) Appl. No.: 09/450,620

(22) Filed: Nov. 30, 1999

(51) Int. Cl.[7] ................................................ H02H 1/00
(52) U.S. Cl. ....................................... 361/220; 361/212
(58) Field of Search ................................ 361/212, 220, 361/56

(56) References Cited

U.S. PATENT DOCUMENTS

| | | | | | |
|---|---|---|---|---|---|
| 4,570,200 | A | | 2/1986 | Osada | 361/212 |
| 4,607,621 | A | | 8/1986 | Wheeler | 128/6 |
| 4,618,222 | A | | 10/1986 | Eisenberg | 350/582 |
| 5,066,422 | A | | 11/1991 | Felter | 252/511 |
| 5,068,748 | A | | 11/1991 | Ukai | 359/59 |
| 5,144,098 | A | | 9/1992 | VanDeusen | 174/36 |
| 5,401,926 | A | | 3/1995 | Aoyama et al. | 200/305 |
| 5,465,186 | A | | 11/1995 | Bajorek | 360/113 |
| 5,497,146 | A | | 3/1996 | Hebiguichi | 340/825.91 |
| 5,511,840 | A | * | 4/1996 | Allison et al. | 294/64.1 |
| 5,597,979 | A | | 1/1997 | Courtney | 174/35 R |
| 5,712,493 | A | | 1/1998 | Mori | 257/59 |
| 5,781,253 | A | | 7/1998 | Moike | 349/40 |
| 6,008,979 | A | * | 12/1999 | Mykkanen et al. | 361/220 |

FOREIGN PATENT DOCUMENTS

| | | | |
|---|---|---|---|
| DE | G 92 00 518.7 | 11/1992 | H05K/9/00 |
| EP | WO 98/20719 | 5/1998 | H05K/9/00 |

* cited by examiner

*Primary Examiner*—Stephen W. Jackson
(74) *Attorney, Agent, or Firm*—Wall Marjama & Bilinski, LLP

(57) ABSTRACT

The invention is an electrostatic charge resistant instrument system comprising at least one instrument, a lead extending from the instrument, and at least one connector associated with the lead. In accordance with the invention, each component of the instrument system is made to have an electrically grounded conductive outer surface so that electrostatic charges are prevented from building up substantially throughout the entire instrument system. A lead of the system can be made to have a conductive outer surface by forming about the lead a flexible conductive housing provided by at least one small diametered wire arranged to encircle the lead a plurality of times in a spiral, mesh or braided mesh configuration. Conductive outer surfaces of instruments and connectors, meanwhile, may be provided by forming the instruments and connectors of the system from conductive polymeric materials containing a polymeric base material and conductive fibers and or particles embedded therein. A connector may be formed on a lead by first forming an elongated conductive flexible housing on a lead and then overmolding a conductive material directly onto the lead conductive housing during the formation of the connector.

29 Claims, 6 Drawing Sheets

ELECTROSTATIC CHARGE RESISTANT INSTRUMENT SYSTEM

BACKGROUND OF THE INVENTION

1. Field of the Invention

The present invention relates generally to electrostatic charge resistant apparatuses and specifically to an electrostatic charge resistant instrument system comprising at least one instrument, a lead extending from the instrument and at least one connector associated with the lead.

2. Background of the Prior Art

Electrostatic charges tend to build up on instruments comprised of insulative materials. In certain work environments an electrostatic discharge (ESD) of charges built up on an insulative member can destroy a workpiece. In the electronics manufacturing industry, electrostatic discharges of charges built up on insulative bar code scanners have been observed to destroy sensitive electrical components such as semiconductor chips. In other work environments, particularly those containing flammable materials, electrostatic discharge of charges built on insulative instruments have been observed to cause fires.

Attempts have been made in the prior art to counter problems of electrostatic discharges from components operating in a "clean room" working environment. In one method for countering electrostatic charge build up, a spray-on conductive film is applied to numerous components of an instrument system. This approach exhibits numerous limitations. First, the conductive film tends to leave a residue on the hands of an operator working with the various components the film is applied to. Second, the conductive film tends to wear off of the components, breaking the conductive path intended to be created by the application of the film. Finally, secure electrical connections between the surfaces of various components are difficult to achieve using conductive film.

There is a need for an electrostatic charge resistant instrument system that does not utilize "spray-on" conductive film, and that provides durable resistance to electrostatic charge build up that does not diminish over time.

SUMMARY OF THE INVENTION

According to its major aspects and broadly stated the present invention is an electrostatic charge resistant instrument system comprising at least one instrument, a lead extending from the instrument, and at least one connector associated with the lead. In accordance with the invention, each component of the instrument system is made to have an electrically grounded conductive outer surface to the end that the instrument system is substantially comprehensively resistant to electrostatic charge build up.

A lead of the system can be made to have a conductive outer surface by forming about the lead a flexible conductive housing. A flexible conductive housing is readily provided by at least one small-diametered wire arranged to encircle the lead a plurality of times in a spiral, mesh or braided mesh configuration.

Conductive outer surfaces of instruments and connectors, meanwhile, may be provided by forming the instruments and connectors of the system from conductive polymeric materials containing a polymeric base material and conductive fibers and or particles embedded therein.

According to a preferred manufacturing scheme for making the invention, a connector is formed on a lead by first forming an elongated conductive flexible housing on a lead and then overmolding a conductive material directly onto the lead conductive housing during the formation of the connector. This manufacturing scheme establishes a secure mechanical connection and good electrical contact between the conductive outer surfaces of the connector and the lead.

Preferably, a conductive outer surface-to-ground electrical connection is provided for each component of the system. An instrument outer surface-to-ground electrical connection may be provided by a ground spring connecting the interior wall of an instrument with a ground conductor of an instrument printed circuit board. Lead and connector outer surface-to-ground electrical connections may be formed by routing an internal ground connector from the interior of the lead to the lead exterior, crimping the ground connector to the conductive outer surface of the lead with use of a crimping ring, and overmolding the connector housing over the ground connector and crimping ring.

These and other details, advantages, and benefits of the present invention will become apparent from the detailed description of the preferred embodiment herein below.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 1A:
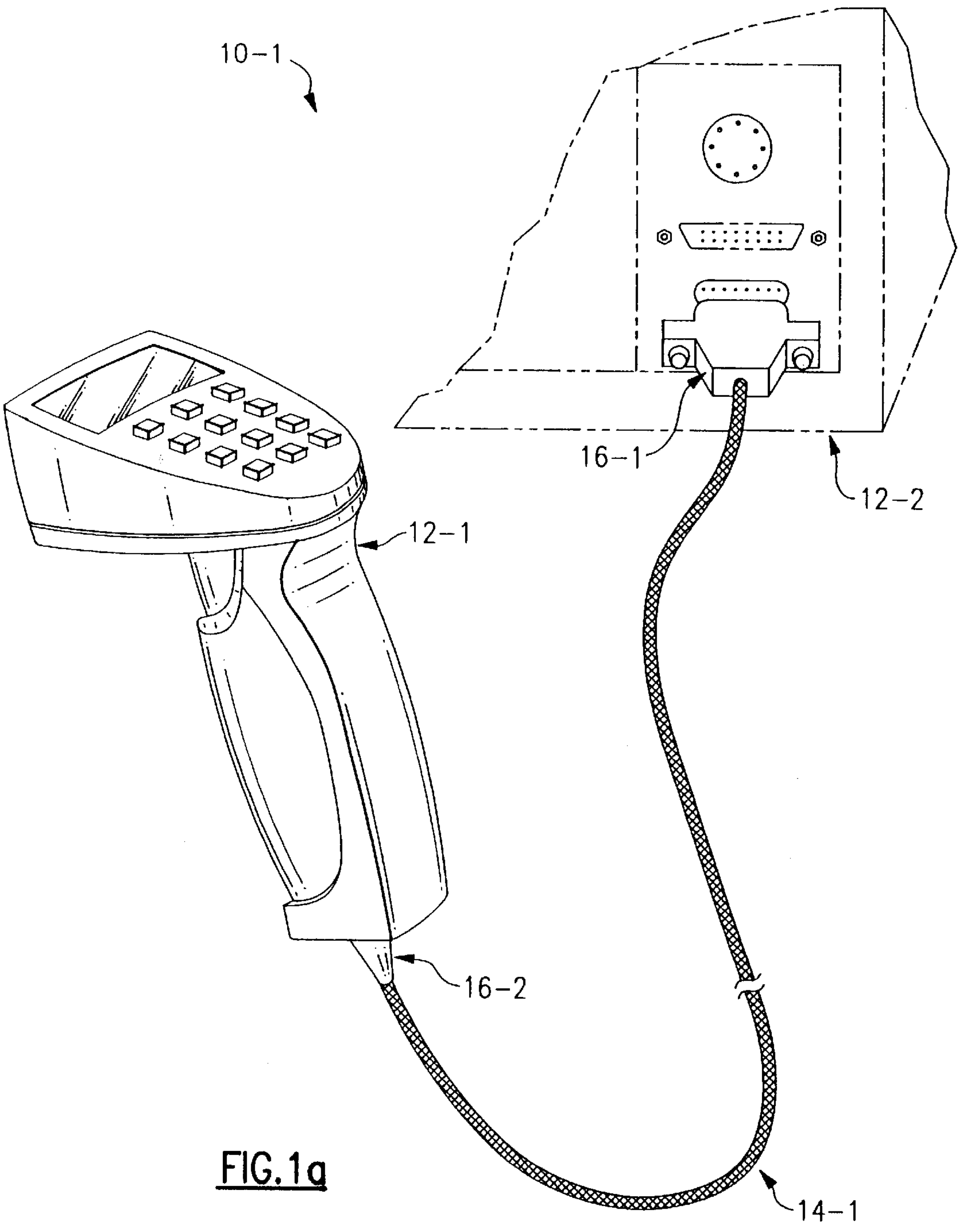
FIGS. 1a–1d show various embodiments of electrostatic charge resistant instrument systems in accordance with the invention.

An electrostatic charge resistant instrument system in accordance with the invention is shown in FIG. 1a. The term "instrument system" herein refers to an instrument and elements supporting operation of the instrument. In the example of FIG. 1a, instrument system 10-1 includes an instrument provided by a bar code reader 12-1, an electrical lead provided by multiconductor cable 14-1, and a connector 16-1. Connector 16-1. in the specific example shown is an interface connector adapting a multiconductor cable to be interfaced with an input/output port of a processing system such as a personal computer. As is indicated by dashed-in personal computers 12-2, and 12-4 of FIGS. 1a and 1b an instrument system may include more than one instrument.

Figure 1B:
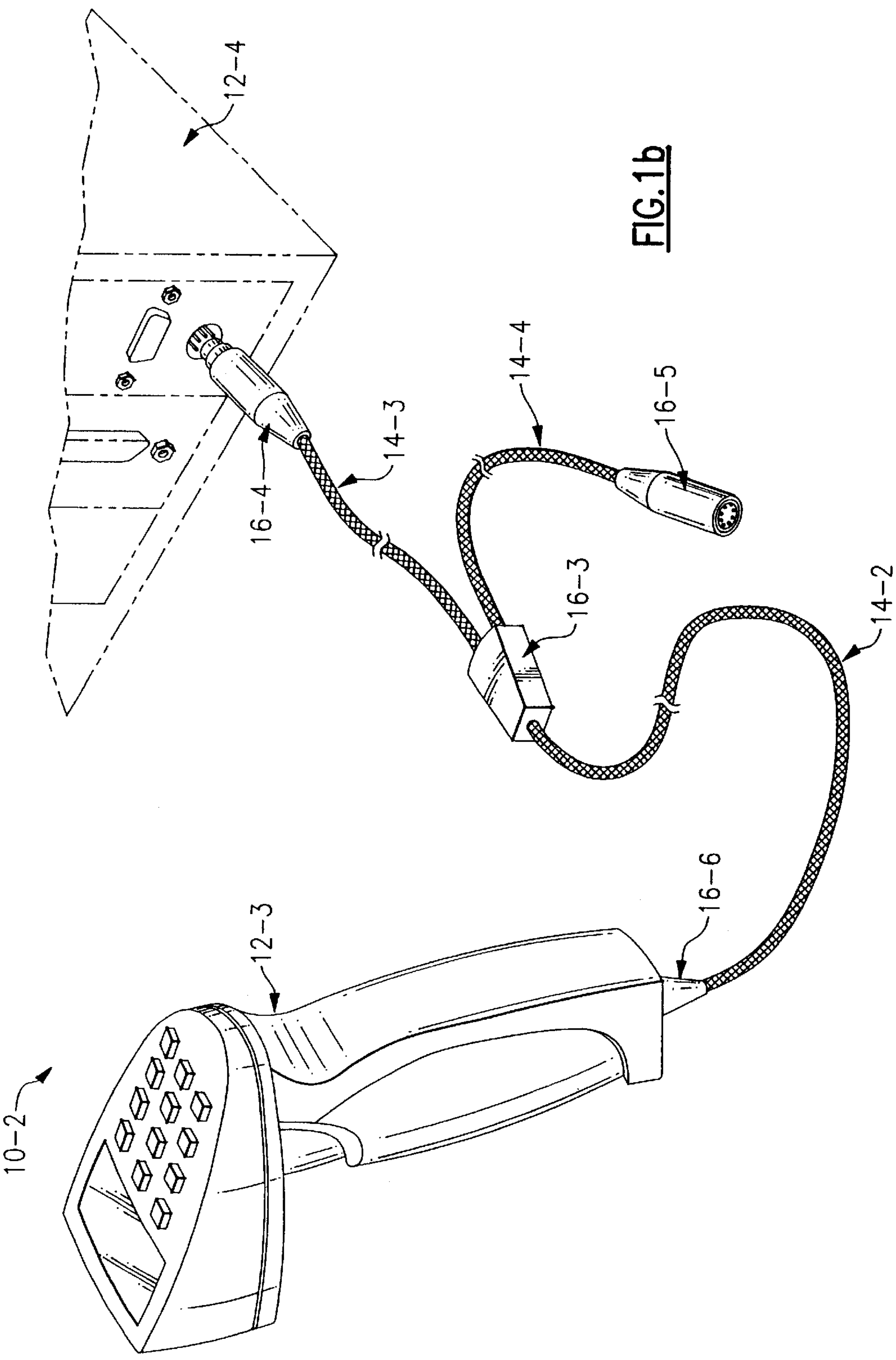

In an alternative embodiment of the invention shown by the system of FIG. 1b, system 10-2 includes several electrical leads provided by multiconductor cable sections 14-2, 14-3, and 14-4 and four connectors including connector 16-3, connector 16-4 and connector 16-5. Connectors 16-4 and 16-5 are interface connectors of the type adapting a length of cable for connection to a device or instrument, while connector 16-3 is junction connector of the type adapted to receive more than one length of cable. In the specific example shown, junction connector 16-3 is a Y type connector providing communication between a peripheral device and a personal computer via a keyboard input port.

While the instruments of FIG. 1*a* and 1*b* are shown as being provided by a bar code reader portable data terminal 12-1, 12-3 and a personal computer 12-2 and 12-4, it will be understood that an instrument of an instrument system in accordance with the invention could be of any type that requires an electrical lead extending therefrom for connection with a remote device. For example, instrument 12 could be provided by another data collection device such as, a wand scanner, a RF reader, a magnetic material reader, or a medical instrument such as a video endoscope, boroscope, or ophthalmoscope or a control box or computer associated with a data collection or medical device. The instrument could also be a machine tool such as a soldering iron or a drill, for example.

In addition to having information carrying conductors, leads of a system according to the invention may include power carrying conductors. A universal serial bus (USB) cable, for example, includes both information carrying conductors and power carrying conductors. An electrical lead in accordance with the invention may also be provided by a power cord comprising power carrying conductors only. For example an instrument system in accordance with the invention may comprise a machine tool and a power cord terminating in a connector provided by power supply plug adapted for reception in a wall outlet power receptacle. Finally, a lead according to the invention may be absent of internal electrical conductors, in the case, for example the lead is provided by a pneumatic tube supplying fluid to and/or from an instrument.

Substantially all of the elements of an instrument system made in accordance with the invention are adapted to resist electrostatic charge build up. A possibility of electrostatic charge build up exists wherever an instrument system includes an element having an insulative outer surface. In accordance with the invention, the outer surface of each element of the system is made to be conductive. Furthermore, an electrical connection is provided between the conductive outer surface of each instrument, lead, and connector of the system to ground. By making the outer surface of each element of the system conductive and by electrically grounding the conductive outer surface of each element, the instrument system is made substantially comprehensively resistant to electrostatic charge build up.

Figure 1C:
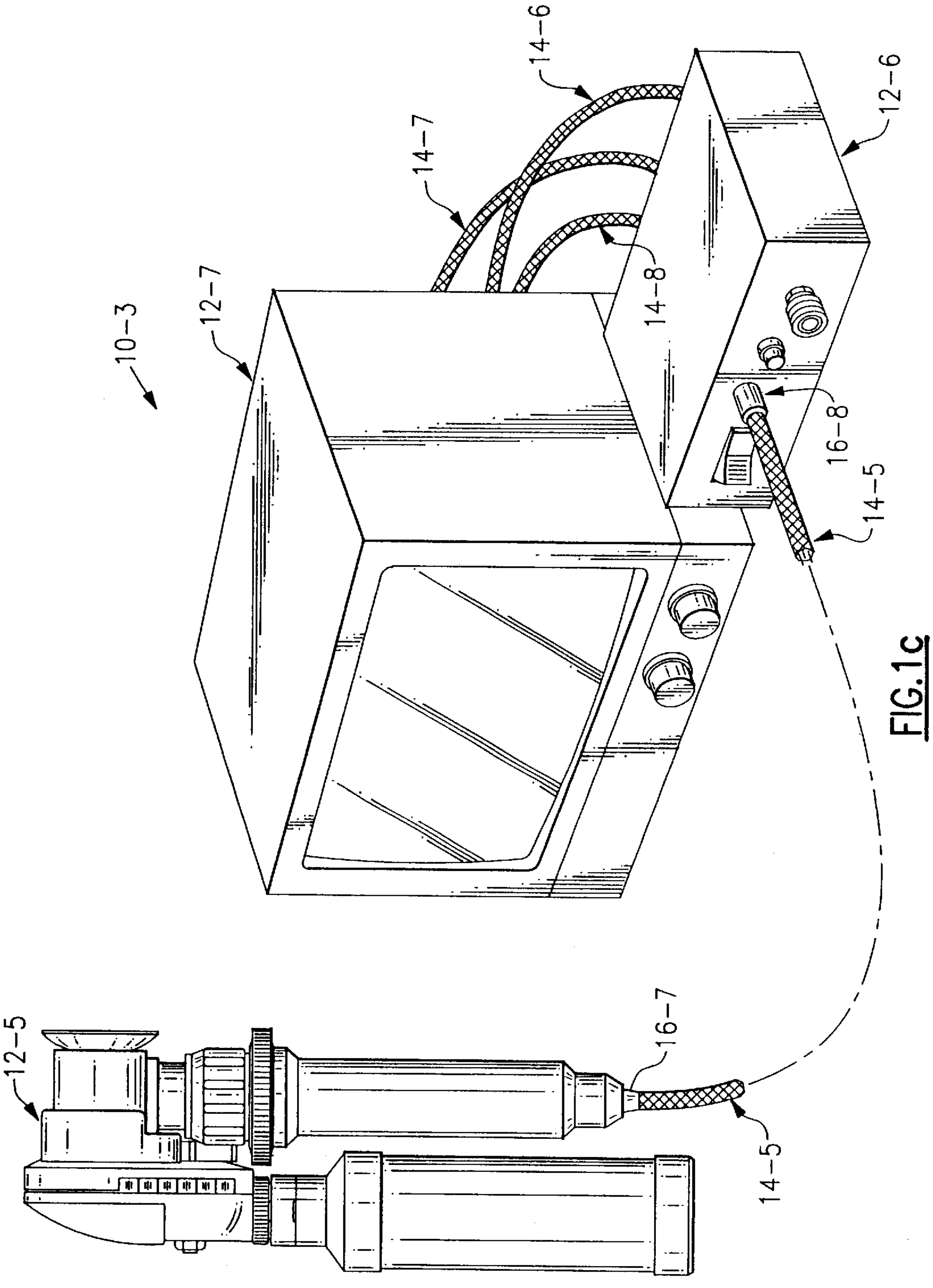
Figure 1D:
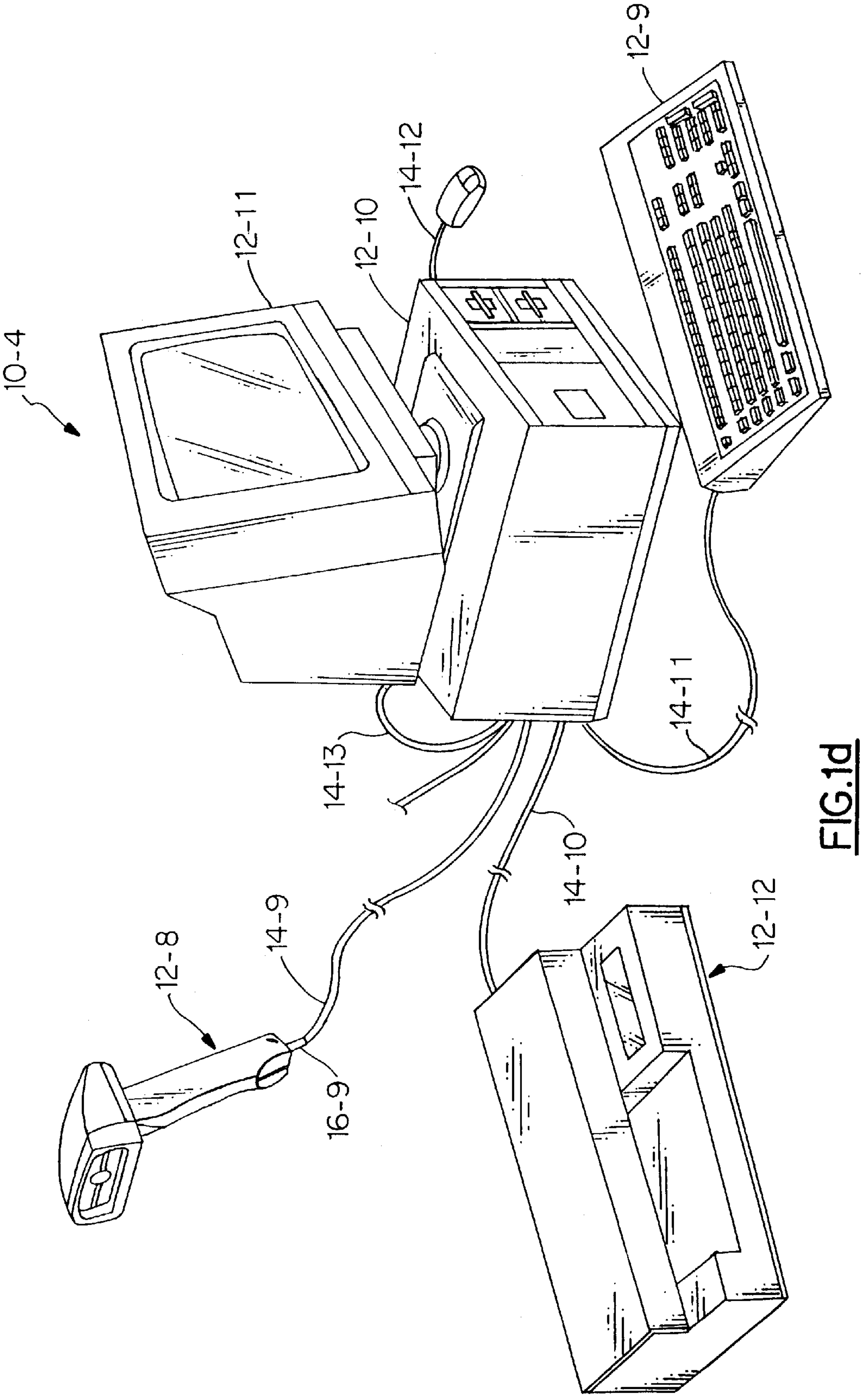

Alternative embodiments of the invention are shown in FIGS. 1*c* and 1*d*. In FIG. 1*c* a medical diagnostic system 10-3 is shown including a video ophthalmoscope. Instruments of the system include a video ophthalmoscope 12-5, a control box 12-6 and monitor 12-7, leads of the system include ophthalmoscope lead 14-5, and monitor leads 14-6, 14-7, 14-8, while connectors of the system include instrument connector 16-7, interface connector 16-8 and the connectors (not shown) associated with the various leads 14-6, 14-7, and 14-8. If each of the components of the medical diagnostic components are adapted in accordance with the invention, then all of the instruments, 12-5, 12-6, 12-7, leads 14-6, 14-7, 14-8, and connectors 16-7 and 16-8 are made to have conductive outer surfaces.

In FIG. 1*d* a data collection device 12-8 is shown in communication with a personal computer system having various instruments including keyboard 12-9, personal computer 12-10, monitor 12-11 and printer 12-12. If all of the components of the system 10-4 of FIG. 1*d* are adapted in accordance with the invention, then all of the instruments 12-8 to 12-12, all of the leads 14-9 to 14-13 and all of the connectors associated with leads including connector 16-9 are made to have conductive outer surfaces.

Figure 2A:
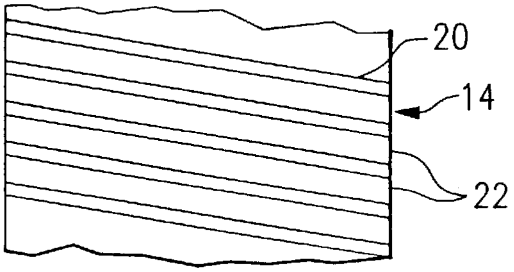
FIGS. 2a–2d show various embodiments of flexible conductive lead housings which may be used with the invention.
Figure 2B:
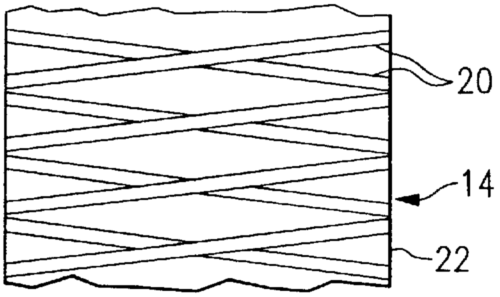
Figure 2C:
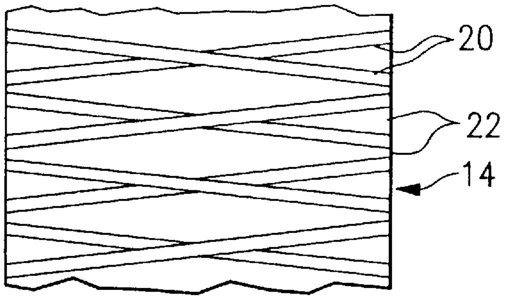
Figure 2D:
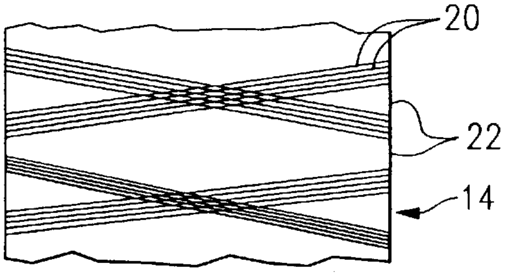

Referring again to FIGS. 1*a* and 1*b*, aspects in the invention rendering system 10 resistant to electrostatic charge build up will be described in detail. A lead according to the invention is made to have a conductive outer surface preferably by forming about the lead an elongated flexible conductive housing. The flexible conductive housing may take on a variety of forms but normally will comprise at least one elongated length of wire 20 having a small diameter (e.g less than about 2 mm) arranged to encircle the circumference of the lead 14 a plurality of times. In a spiral configuration, as shown by FIG. 2*a*, a single small-diametered length of wire 20 is wrapped about a lead a plurality of times. In a mesh configuration, as shown by FIG. 2*b*, at least two elongated lengths of small-diametered wire are wrapped about a lead a plurality of times in opposite directions. In a braided mesh configuration, as shown by FIG. 2*c*, at least two elongated lengths are of small-diametered wires are wrapped about a lead in reverse direction and woven together in an alternating overlapping and underlapping manner to the end that adhesives or other securing agents are not necessary to maintain the lengths of wiring in association with one another. While substantial gaps 22 are shown between the layers of wiring in FIGS. 2*a*, 2*b*, 2*c*, and 2*d* for purposes of illustrating invention it will be understood that in actual embodiments, these gaps may be smaller or essentially nonexistent.

Braided mesh flexible metal housings of the type shown in FIG. 2*c* are available from C&M Corp. of Wauregan, CT. One type of flexible metal housing available from C&M Corp. comprises two bundles of wires, each of which encircles a lead a plurality of times in a braided mesh configuration as indicated by the configuration of FIG. 1*d*. The bundles include 5–10 small-diametered wires, each wire having a diameter of less than about 0.10 mm. The thickness of each bundle is less than about 1.0 mm. Flexible metal housings of the type described are available in a tube form and may be installed on a lead by sliding a length of wire tubing over a lead having substantially the same diameter as the length of tubing. In addition, a process is known among manufacturers of certain types of flexible metal housings of forming a length of tubing directly on a lead during manufacture of the tubing.

Other possible types of flexible conductive housings which may be used with the invention include cable shielding, knitted wire mesh shielding tape, and conductive heat shrinkable shielding. Chomerics, Inc., of Woburn, MA, sells housings under each one of these categories including ZIP-EX-2 cable shielding, SHIELD WRAP knitted wire mesh shielding tape, and CHO-SHRINK conductive heat shrinkable shielding.

Still referring to FIGS. 1*a* and 1*b*, conductive outer surfaces of instruments 12-1 to 12-4 and connectors 16-1. to 16-6 are provided by forming the instrument and connectors from conductive polymeric material such as conductive thermoplastic, including conductive polyvinyl chloride, polyethylene, and ureaformaldehyde. Polymeric materials can be made conductive by mixing metal or other conductive fibers or particles in polymeric materials during a molding process.

In another aspect of the invention, referring again to FIGS. 1*a* and 1*b*, the conductive outer surface of each element of system 10 is electrically connected to ground. In theory, each conductive outer surface of each element of a system in accordance with the invention is electrically connected to ground if the conductive outer surfaces of the various elements are connected to one another and one of the elements is connected to a dedicated ground conductor of the system. It is preferred, however, that several elements of a system in accordance with the invention are electrically connected directly to a dedicated ground conductor.

The outer surface of an instrument of a system in accordance with the invention may be connected to ground by positioning an electrical connector between an interior wall of the conductive outer housing and a dedicated ground conductor of a printed circuit board of an instrument. This type of electrical contact may be provided, for example, by a ground spring connecting the interior wall of the instrument housing and a ground conductor of a printed circuit board.

Figure 3B:
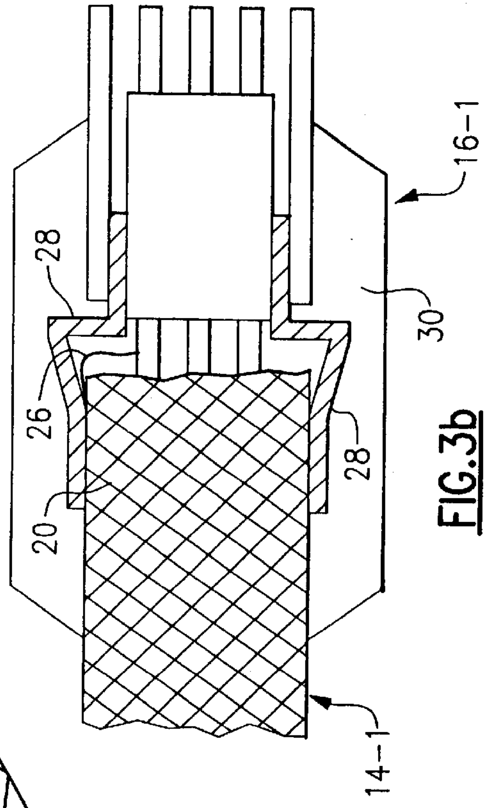
FIG. 3b illustrates a cross sectional view of a connector as installed on a lead in accordance with the invention.
Figure 3A:
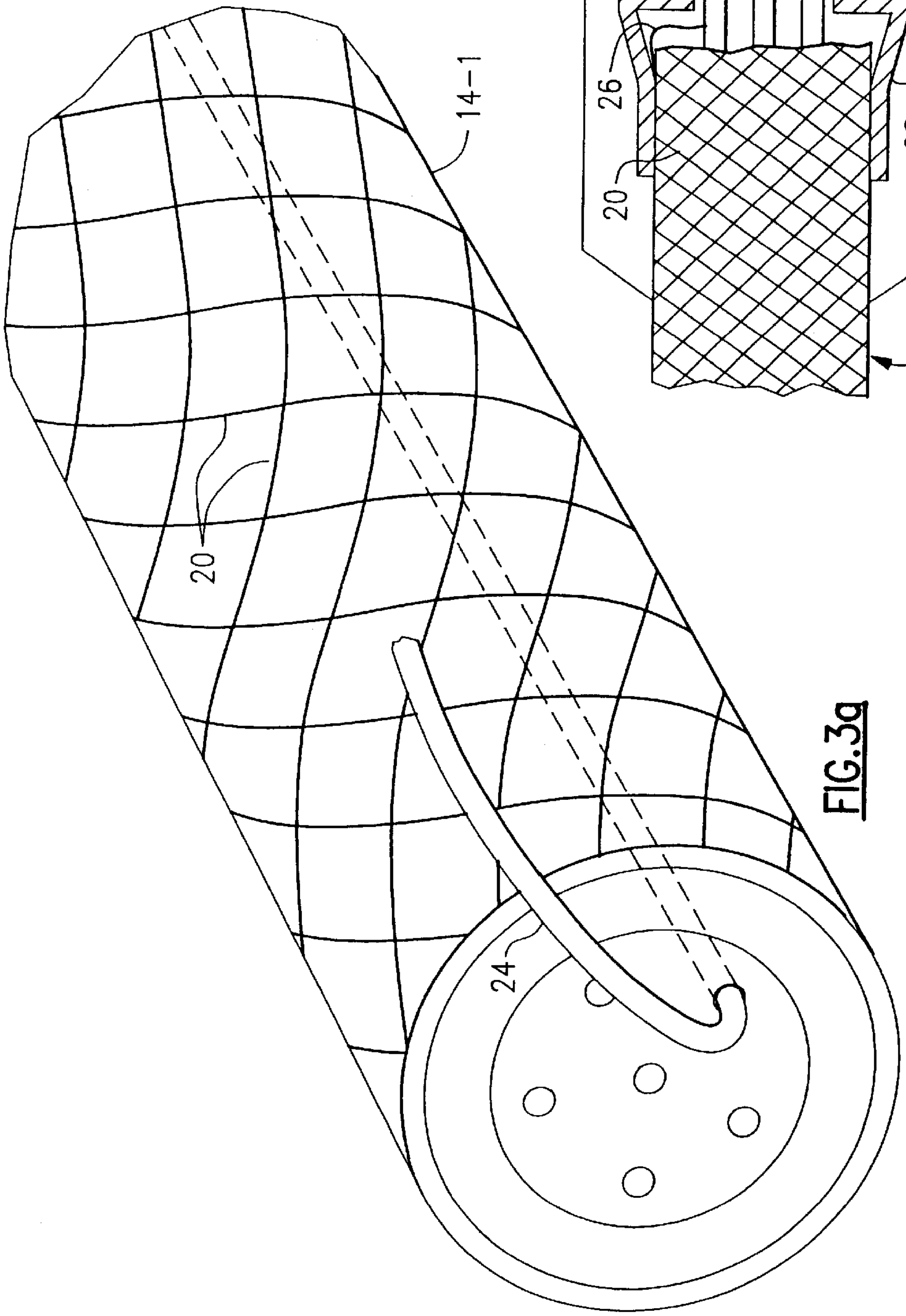
FIG. 3a shows a perspective view of a multiconductor cable lead having a flexible conductor housing for either thereon.

Conductive outer surfaces of leads 14 and conductive outer surfaces of connectors 16 may be electrically connected to ground with use of a crimping ring as is described in connection with FIGS. 3*a* and 3*b*. At the interface between a lead and a connector, a ground wire 24 of cable 14-1 is pulled back and routed to the exterior of a lead 14-1 so that the ground wire is in proximity with wires 20 of the conductive housing of lead 14-1 (alternatively a jumper 26 can be connected to the ground wire as is indicated in FIG. 3*b*, and routed to a position in proximity with housing). Then, as indicated in FIG. 3*b* a crimping ring 28 is fitted over ground conductor 26 and crimped so that good electrical and mechanical contact is formed between conductor 26 and wires 20 of the housing. After conductor 26 is crimped in secure contact with wires 20, conductive polymeric material 30 is injected or poured into a mold (not shown) and hardens to form the conductive housing of the connector.

The hardening of the polymeric material about an elongated housing formed on a lead provides a secure mechanical connection between the connector and the lead and good electrical contact between the outer surfaces of the lead and the connector. Establishing good electrical connection between outer surfaces of a lead and a connector is especially important in the case that the connector is of a type that is not directly connected to a ground connector. The connector formation method involving the overmolding of conductive polymeric material about a conductive housing of a lead associated with the conductor may be used in the formation of any connector described herein.

In a typical system, a first connector on one end of a lead is directly connected to a dedicated ground conductor in accordance with the method described in connection with FIGS. 3*a* and 3*b* while a second connector on a second end of the lead is indirectly connected to a ground conductor at least via a path established by the electrical connection between the connector and lead outer surfaces. In many instances multiple conductive paths are provided between the conductive outer surfaces of elements of a system in accordance with the invention and ground.

With reference to FIG. 1*b*, connector 16-3 may be directly connected to a dedicated ground conductor of a lead via the method described with reference to FIGS. 3*a* and 3*b* while connector 16-6 may be connected to ground via its electrical contact with the elongated housing of lead 14-2, which is connected directly to a dedicated ground conductor of lead 14-2 via the method described in connection with FIGS. 3*a* and 3*b* and via its electrical contact with the outer surface of instrument 12-3. Instrument 12-3 and connector 16-6 may be complimentarily formed so that the outer surfaces of instrument 12-3 and connector 16-6 are brought into compression contact by the reception of connector 16-6 into a receptacle of instrument 12-3. While it is preferred that the outer surfaces of connector 16-6 and instrument 12-3 are in electrical contact, such an electrical contact is normally not necessary since connector 16-6 is normally grounded via its connection to the elongated housing of lead 14-2 which is connected to a dedicated ground conductor of lead, which is normally electrically connected to a dedicated ground conductor of a printed circuit board of instrument 12-3. Connector 16-4 may also have two indirect ground connections. Connector 16-4 may be grounded first via its electrical contact with the elongated housing of lead 14-3 and second via compression contact with a ground conductor of computer 12-4. Connector 16-4 and computer 12-4 may be complimentarily formed so that securing connector 16-4 to computer 12-4 brings the conductive surface of connector in contact with a ground conductor (not shown) of computer 12-4. Likewise, in the example of FIG. 1*a* connector 16-1. and computer 12-2 may be complimentarily formed so that screw-tightening of connector 16-1. to computer 12-2 brings the conductive outer surface of connector 16-1. into compression contact with a ground conductor (not shown) of computer 12-2.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims.

In the claims:

1. An electrostatic charge resistant instrument system comprising;

at least one instrument;

an elongated electrical lead extending from said at least one instrument terminating on at least one end in a connector, wherein each of said at least one instrument, said lead, and said connector includes an electrically grounded conductive outer surface.

2. The system of claim 1, wherein said conductive outer surface of said lead includes a flexible elongated conductive housing formed thereon substantially along a length of said lead.

3. The system of claim 2, wherein said conductive outer surface of said lead includes a flexible elongated conductive housing, and wherein said elongated conductive housing comprises at least one small diametered wire arranged to encircle said lead a plurality of times.

4. The system of claim 2, wherein said conductive outer surface of said lead includes a flexible elongated conductive housing, and wherein said elongated conductive housing comprises at least two small diametered wires arranged to encircle said lead a plurality of times in opposite directions.

5. The system of claim 2, wherein said conductive outer surface of said lead includes a flexible elongated conductive housing, and wherein said elongated conductive housing comprises at least two small-diametered wires arranged to encircle said lead a plurality of times in opposite directions in an alternating overlopping and underlapping mesh configuration.

6. The system of claim 1, wherein an outer surface of said at least one instrument is formed from a conductive polymeric material.

7. The system of claim 1, wherein an outer surface of said connector is formed from a conductive polymeric material.

8. The system of claim 1, wherein outer surfaces of said at least one instrument and said connector are formed from conductive polymeric material.

9. The system of claim 1, wherein said outer surface of said lead includes a flexible elongated conductive housing and wherein outer surfaces of said at least one instrument and said connector are formed from conductive polymeric material.

10. The system of claim 1, wherein said outer surface of said lead includes a flexible elongated conductive housing, wherein outer surfaces of said at least one instrument and said connector are formed from conductive polymeric material and wherein an electrical connection between said outer surface of said connector and said outer surface of said conductive housing of said lead is formed by overmolding conductive polymeric material onto said conductive housing in the formation of said connector.

11. The system of claim 1, wherein said outer surface of said lead includes a flexible elongated conductive housing wherein outer surfaces of said at least one instrument and said connector are formed from conductive polymeric material, wherein said lead and said connector are electrically connected, and wherein said flexible elongated conductive housing comprises at least one small diametered wire arranged to encircle said lead a plurality of times.

12. The system of claim 1, wherein said outer surface of said lead includes a flexible elongated conductive housing wherein outer surfaces of said at least one instrument and said connector are formed from conductive polymeric material, wherein said lead and said connector are electrically connected, and wherein said elongated conductive housing comprises at least two small diametered wires arranged to encircle said lead a plurality of times in opposite directions.

13. The system of claim 1, wherein said outer surface of said lead includes a flexible elongated conductive housing wherein outer surfaces of said at least one instrument and said connector are formed from conductive polymeric material, wherein said lead and said connector are electrically connected, and wherein said flexible elongated conductor comprises at least two small-diametered wires arranged to encircle said lead a plurality of times in opposite directions in an alternating overlapping and underlapping mesh configuration.

14. The system of claim 1, wherein said system includes at least two instruments, wherein a first of said instruments is a data collection device and a second of said instruments is a personal computer having a conductive polymeric housing, wherein said lead extending from said at least one instrument is a multiconductor cable connecting said data collection device to said personal computer, wherein said lead includes an elongated flexible conductive housing extending substantially along a length of said lead, and wherein said connector is formed of a conductive polymeric material and overmolded onto said housing.

15. The system of claim 14 further comprising a mouse having a conductive outer surface and being connected to said personal computer by a lead having a conductive outer surface.

16. The system of claim 14 further comprising a mouse, a keyboard, and a monitor, each comprising a conductive outer surface and being connected to said personal computer by a lead having a conductive outer surface.

17. The system of claim 1, wherein said system includes at least two instruments, wherein a first of said instruments is a medical device and a second of said instruments is a control box having a conductive polymeric housing, wherein said lead extending from said at least one instrument is a multiconductor cable connecting said medical device to said control box, wherein said lead includes an elongated flexible conductive housing extending substantially along a length of said lead, and wherein said connector is formed of a conductive polymeric material overmolded onto said housing.

18. The system of claim 1, further comprising a monitor having a conductive outer surface and being connected to said control box by a lead having a conductive outer surface.

19. An electrostatic charge resistant instrument system comprising:

at least one instrument;

an elongated electrical lead extending from said at least one instrument, wherein said electrical lead is adapted for attaching said at least one instrument either to a resistive instrument or to a wall outlet and wherein each of said at least one instrument and said lead includes an electrically grounded conductive outer surface.

20. The system of claim 19, wherein said conductive outer surface of said lead includes a flexible elongated conductive housing formed thereon substantially along a length of said lead.

21. The system of claim 20, wherein said conductive outer surface of said lead includes a flexible elongated conductive housing, and wherein said elongated conductive housing comprises at least one small diametered wire arranged to encircle said lead a plurality of times.

22. The system of claim 20, wherein said conductive outer surface of said lead includes a flexible elongated conductive housing, and wherein said elongated conductive housing comprises at least two small diametered wires arranged to encircle said lead a plurality of times in opposite directions.

23. The system of claim 20, wherein said conductive outer surface of said lead includes a flexible elongated conductive housing, and wherein said elongated conductive housing comprises at least two small-diametered wires arranged to encircle said lead a plurality of times in opposite directions in an alternating overlapping and underlappingmesh configuration.

24. The system of claim 19, wherein an outer surface of said at least one instrument is formed from a conductive polymeric material.

25. The system of claim 19, wherein said system includes at least two instruments, wherein a first of said instruments is a data collection device and a second of said instruments is a personal computer having a conductive polymeric housing, wherein said lead extending from said at least one instrument is a multiconductor cable connecting said data collection device to said personal computer, and wherein said lead includes an elongated flexible conductive housing extending substantially along a length of said lead.

26. The system of claim 25, further comprising a mouse having a conductive outer surface and being connected to said personal computer by a lead having a conductive outer surface.

27. The system of claim 25, further comprising a mouse, a keyboard, and a monitor, each comprising a conductive outer surface and being connected to said personal computer by a lead having a conductive outer surface.

28. The system of claim 19, wherein said system includes at least two instruments, wherein a first of said instruments is a medical device and a second of said instruments is a control box having a conductive polymeric housing, wherein said lead extending from said at least one instrument is a multiconductor cable connecting said medical device to said control box, and wherein said lead includes an elongated flexible conductive housing extending substantially along a length of said lead.

29. The system of claim 28, further comprising a monitor having a conductive outer surface and being connected to said control box by a lead having a conductive outer surface.

* * * * *

UNITED STATES PATENT AND TRADEMARK OFFICE

CERTIFICATE OF CORRECTION

PATENT NO. : 6,370,003 B1
DATED : April 9, 2002
INVENTOR(S) : Hennick

It is certified that error appears in the above-identified patent and that said Letters Patent is hereby corrected as shown below:

Column 6,
Line 25, after the word "comprising" please delete the semi colon ";" and insert colon -- : --, and
Line 26, after the word "instrument"; please insert the word -- and --.

Column 8,
Line 3, after the word "instrument"; please insert the word -- and --, and
Line 7, please delete the word "resistive" and insert the word -- remote --.

Signed and Sealed this

Fifteenth Day of October, 2002

*Attest:*

JAMES E. ROGAN

*Attesting Officer*

*Director of the United States Patent and Trademark Office*